US012306431B2

(12) United States Patent
Chen

(10) Patent No.: US 12,306,431 B2
(45) Date of Patent: *May 20, 2025

(54) KEYSWITCH HAVING BACKLIGHT MODULE WITH MULTIPLE LIGHTING UNITS AND LIGHT MODIFIERS

(71) Applicant: Darfon Electronics Corp., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,799

(22) Filed: Nov. 16, 2023

(65) Prior Publication Data

US 2024/0118480 A1    Apr. 11, 2024

Related U.S. Application Data

(63) Continuation of application No. 18/235,897, filed on Aug. 21, 2023, now Pat. No. 11,914,185.

(Continued)

(51) Int. Cl.
*H01H 13/02* (2006.01)
*F21V 8/00* (2006.01)
*H01H 13/14* (2006.01)

(52) U.S. Cl.
CPC .......... *G02B 6/006* (2013.01); *G02B 6/0068* (2013.01); *H01H 13/023* (2013.01); *H01H 13/14* (2013.01)

(58) Field of Classification Search
CPC .... H01H 13/023; H01H 13/026; H01H 9/161; H01H 9/182; H01H 2009/183; G02B 6/0068; G02B 6/006; F21K 9/61
See application file for complete search history.

(56) References Cited

U.S. PATENT DOCUMENTS 2,953,668 A * 9/1960 Bassett, Jr. ............... F21S 8/00
                                                    200/312
3,103,659 A * 9/1963 Edwards ............... H02B 15/00
                                                    359/891

(Continued)

FOREIGN PATENT DOCUMENTS

CN      101514801 A      8/2009
CN      201758091 U      3/2011

(Continued)

OTHER PUBLICATIONS

Chen, the specification, including the claims, and drawings in the U.S. Appl. No. 18/077,214, Filing Date: Dec. 7, 2022.

*Primary Examiner* — Ismael Negron
(74) *Attorney, Agent, or Firm* — McClure, Qualey & Rodack, LLP

(57) ABSTRACT

A backlight keyswitch includes a cap with a symbol, and a backlight module under the cap and having first and second light modifying layers, a light guide plate, a light-blocking sheet having a transparent region corresponding to the cap, and first and second lighting units at opposite ends in a longitudinal direction for emitting first and second color lights. The first and second light modifying layers might be ink layers formed on the light-blocking sheet and located outside the first and second lighting units, with colors of the first and second ink layers at least corresponding to colors of the second and first color lights respectively to achieve a mixed color. Alternatively, the first and second light modifying layers might be adhesive layers arranged parallel to the light guide plate, the first and second adhesive layers scattering a respective one of the first and second color light.

24 Claims, 9 Drawing Sheets

Related U.S. Application Data

(60) Provisional application No. 63/413,579, filed on Oct. 5, 2022.

(56) References Cited

U.S. PATENT DOCUMENTS

| | | | | |
|---|---|---|---|---|
| 3,157,771 | A * | 11/1964 | Roeser | H01H 13/58 200/276 |
| 3,467,802 | A * | 9/1969 | Martin | H01H 13/023 200/314 |
| 3,639,745 | A * | 2/1972 | Shiki | H02B 1/048 200/314 |
| 4,346,275 | A * | 8/1982 | Iwakiri | H01H 13/023 200/314 |
| 4,535,396 | A * | 8/1985 | Guthrie | G09F 13/06 362/268 |
| 4,722,028 | A * | 1/1988 | Brannon | G01D 11/28 362/23.18 |
| 5,150,257 | A * | 9/1992 | Mohabbatizadeh | H01H 13/023 349/1 |
| 5,434,377 | A * | 7/1995 | Martin | H01H 13/023 200/314 |
| 6,210,010 | B1 * | 4/2001 | Pontetti | H01H 13/023 362/85 |
| 6,558,013 | B2 * | 5/2003 | Tholin | H01H 13/023 362/85 |
| 2009/0140891 | A1 | 6/2009 | Ragusa | |
| 2012/0275193 | A1 | 11/2012 | Yoshida | |
| 2019/0371538 | A1 | 12/2019 | Huang | |
| 2023/0317386 | A1 * | 10/2023 | Huang | H01H 3/125 200/314 |

FOREIGN PATENT DOCUMENTS

| | | |
|---|---|---|
| CN | 203377146 U | 1/2014 |
| CN | 104252987 A | 12/2014 |
| CN | 214310968 U | 9/2021 |
| TW | I269993 | 1/2007 |
| TW | M321552 | 11/2007 |
| TW | 200945114 | 11/2009 |
| TW | 201419343 A | 5/2014 |
| TW | I494960 B | 8/2015 |
| TW | 202211277 A | 3/2022 |

\* cited by examiner

KEYSWITCH HAVING BACKLIGHT MODULE WITH MULTIPLE LIGHTING UNITS AND LIGHT MODIFIERS

CROSS REFERENCE TO RELATED APPLICATION

This application is a continuation application of U.S. application Ser. No. 18/235,897 filed on Aug. 21, 2023, now U.S. Pat. No. 11,914,185, which claims the benefit of U.S. Provisional Application No. 63/413,579, filed on Oct. 5, 2022. The content of the application is incorporated herein by reference.

BACKGROUND OF THE INVENTION

1. Field of the Invention

The present invention relates to a backlight keyswitch and a backlight module thereof, and more specifically, to a backlight keyswitch utilizing ink layers to partially adjusting color lights of lighting units and utilizing adhesive layers to scatter the color lights of the lighting units and a backlight module thereof.

2. Description of the Prior Art

In general, for providing a keyswitch lighting function, the common lighting design involves placing a circuit board with a plurality of light emitting diodes (LEDs) on a board of a keyboard, each light emitting diode corresponding to one keyswitch. Accordingly, the light emitting diode can emit light to a corresponding symbol on a cap of the keyswitch for generating the symbol lighting effect. The aforesaid lighting design usually adopts RGB LEDs composed of red, green, and blue LED chips arranged side by side. However, due to different mixing distances between the symbol and the red, green, and blue LED chips, there often arises a color shift problem in the symbol lighting effect. For example, an area of the symbol closer to the red LED chip may show a reddish color, while an area of the symbol closer to the blue LED chip may show a bluish color. This affects the lighting uniformity and the visual effect of the backlight keyswitch in use.

SUMMARY OF THE INVENTION

Thus, one purpose of the present invention is to provide a backlight keyswitch utilizing ink layers to partially adjusting color lights of lighting units and utilizing adhesive layers to scatter the color lights of the lighting units and a backlight module thereof, to solve the aforesaid problems.

According to one embodiment, a backlight keyswitch provided by the present invention includes a keyswitch body and a backlight module. The keyswitch body has a cap with at least one symbol formed thereon. The backlight module is disposed under the cap. The backlight module includes a light-blocking sheet, a light guide plate, a backlight circuit board, a first ink layer, and the second ink layer. The light-blocking sheet has a transparent region corresponding to the cap. The light guide plate is disposed under the light-blocking sheet and has an accommodating hole. The backlight circuit board is disposed under the light guide plate and has a backlight source. The backlight source is disposed in the accommodating hole and includes a first lighting unit, a second lighting unit, and a third lighting unit, wherein the first lighting unit, the third lighting unit, and the second lighting unit are arranged sequentially along a longitudinal direction for emitting a first color light, a third color light, and a second color light respectively to be incident to the transparent region after light mixing. The first ink layer is formed on the light-blocking sheet and located outside the first lighting unit. A color of the first ink layer at least corresponds to a color of the second color light to achieve a mixed color with the first color light. The second ink layer is formed on the light-blocking sheet and located outside the second lighting unit for partially adjusting the second color light. A color of the second ink layer at least corresponds to a color of the first color light to achieve the mixed color with the second color light.

According to another embodiment, a backlight keyswitch provided by the present invention includes a keyswitch body and a backlight module. The keyswitch body has a cap with at least one symbol formed thereon. The backlight module is disposed under the cap. The backlight module includes a light-blocking sheet, a light guide plate, a backlight circuit board, a first adhesive layer, and the second adhesive layer. The light-blocking sheet has a transparent region corresponding to the cap. The light guide plate is disposed under the light-blocking sheet and has an accommodating hole corresponding to the cap. The backlight circuit board is disposed under the light guide plate and has a backlight source. The backlight source is disposed in the accommodating hole and includes a first lighting unit, a second lighting unit, and a third lighting unit, wherein the first lighting unit, the third lighting unit, and the second lighting unit are arranged sequentially along a longitudinal direction for emitting a first color light, a third color light, and a second color light respectively to be incident to the transparent region after light mixing. The first adhesive layer is disposed in parallel to the light guide plate. The first adhesive layer extends along a first hole edge of the accommodating hole and corresponds to the first lighting unit. The second adhesive layer is disposed in parallel to the light guide plate. The second adhesive layer extends along a second hole edge of the accommodating hole and corresponds to the second lighting unit, and the second adhesive layer and the first adhesive layer together define at least one first adhesive gap area in a transverse direction. The second adhesive layer scatters the second color light to reduce the second color light reaching an outer side of the second adhesive layer in the longitudinal direction, and the at least one first adhesive gap area makes more second color light incident to a first outer side region adjacent to the first lighting unit. The first adhesive layer scatters the first color light to reduce the first color light reaching an outer side of the first adhesive layer in the longitudinal direction, and the at least one first adhesive gap area makes more first color light incident to a second outer side region adjacent to the second lighting unit.

According to another embodiment, a backlight module provided by the present invention includes a light-blocking sheet, a light guide plate, a backlight circuit board, a first ink layer, and the second ink layer. The light-blocking sheet has a transparent region. The light guide plate is disposed under the light-blocking sheet and has an accommodating hole. The backlight circuit board is disposed under the light guide plate and has a backlight source. The backlight source is disposed in the accommodating hole and includes a first lighting unit, a second lighting unit, and the third lighting unit, wherein the first lighting unit, the third lighting unit, and the second lighting unit are arranged sequentially along a longitudinal direction for emitting a first color light, a third color light, and a second color light respectively to be incident to the transparent region after light mixing. The first ink layer is formed on the light-blocking sheet and located outside the first lighting unit. A color of the first ink layer at least corresponds to a color of the second color light to achieve a mixed color with the first color light. The second ink layer is formed on the light-blocking sheet and located outside the second lighting unit. A color of the second ink layer at least corresponds to a color of the first color light to achieve the mixed color with the second color light.

According to another embodiment, a backlight module provided by the present invention includes a light-blocking sheet, a light guide plate, a backlight circuit board, a first adhesive layer, and the second adhesive layer. The light-blocking sheet has a transparent region. The light guide plate has an accommodating hole. The backlight circuit board is disposed under the light guide plate and has a backlight source. The backlight source is disposed in the accommodating hole and includes a first lighting unit, a second lighting unit, and the third lighting unit, wherein the first lighting unit, the third lighting unit, and the second lighting unit are arranged sequentially along a longitudinal direction for emitting a first color light, a third color light, and a second color light respectively to be incident to the transparent region after light mixing. The first adhesive layer is disposed in parallel to the light guide plate. The first adhesive layer extends along a first hole edge of the accommodating hole and corresponds to the first lighting unit. The second adhesive layer is disposed in parallel to the light guide plate, the second adhesive layer extends along a second hole edge of the accommodating hole and corresponding to the second lighting unit, and the second adhesive layer and the first adhesive layer together define at least one first adhesive gap area in a transverse direction. The second adhesive layer scatters the second color light to reduce the second color light reaching an outer side of the second adhesive layer in the longitudinal direction, and the at least one first adhesive gap area makes more second color light incident to a first outer side region adjacent to the first lighting unit. The first adhesive layer scatters the first color light to reduce the first color light reaching an outer side of the first adhesive layer in the longitudinal direction, and the at least one first adhesive gap area makes more first color light incident to a second outer side region adjacent to the second lighting unit.

In summary, the backlight keyswitch provided by the present invention can utilize the first ink layer to partially filter the first color light and utilize the second ink layer to partially filter the second color light. This design can eliminate the color shift problem that the first color shift area of the symbol close to the first lighting unit may show a lighting color shifting to the first color light while the second color shift area of the symbol close to the second lighting unit may show a lighting color shifting to the second color light. Furthermore, the backlight keyswitch provided by the present invention also adopts the adhesive gap design in which the first adhesive layer and the second adhesive layer respectively scatter/absorb the first color light and the second color light and the first color light and the second color light can be scattered toward the second color shift area and the first color shift area respectively through the adhesive gap area. As such, the present invention can eliminate the color shift problem that the lighting color of the first color shift area of the symbol is shifted to the color of the first color light and the lighting color of the second color shift area of the symbol is shifted to the color of the second color light. In such a manner, the present invention can efficiently solve the prior art problem that lighting color shift occurs in the area of the symbol closer to the LED chip, so as to greatly enhance the lighting uniformity and the visual effect of the backlight keyswitch in use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
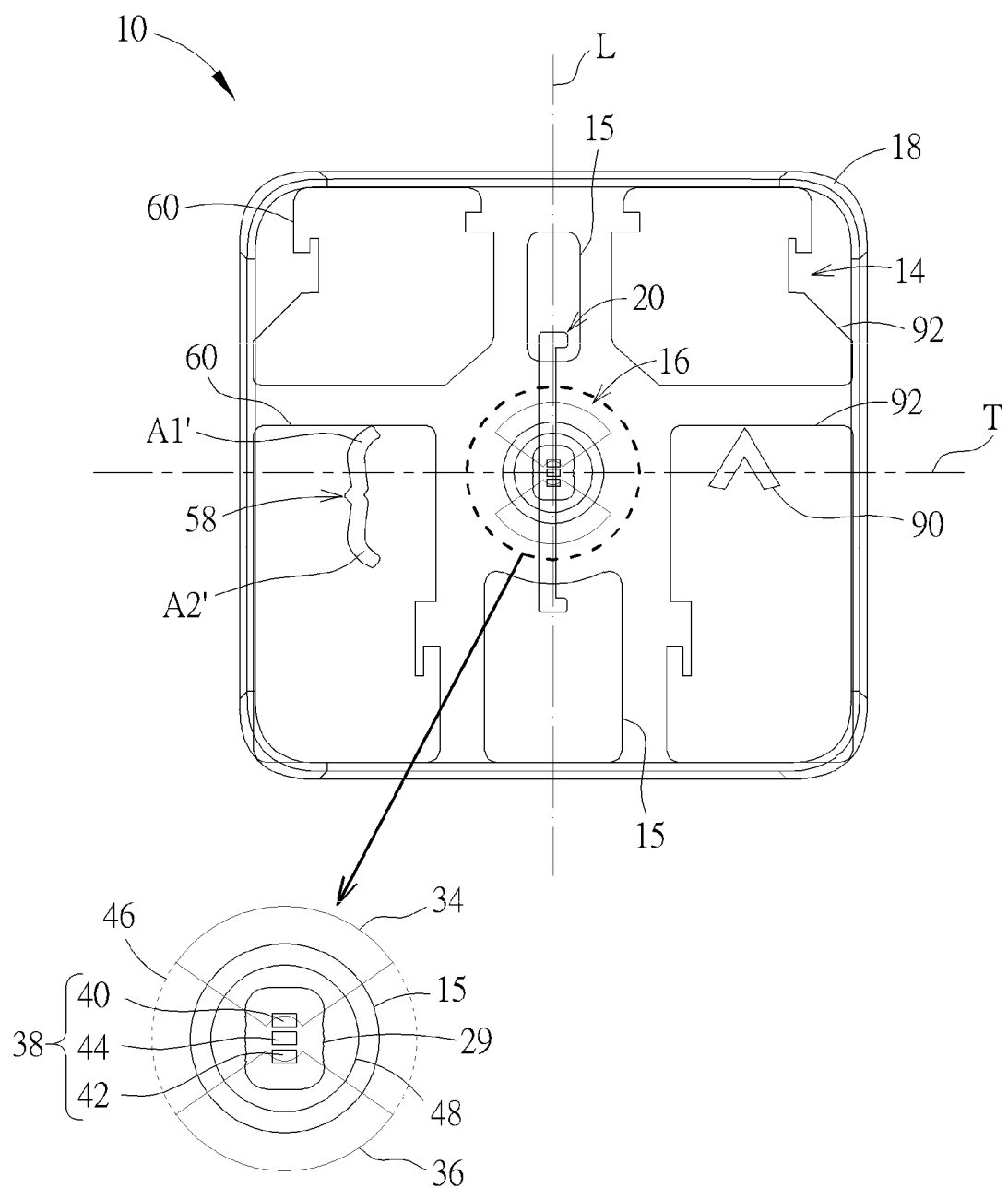
FIG. 1 is a top perspective view of a backlight keyswitch according to an embodiment of the present invention.

The present invention will now be described more specifically with reference to the following embodiments. The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the configuration of each component (e.g., size ratio of ink layers, and number, forming positions and size ratios of symbols and through holes) in the drawings is merely illustrative, not presenting an actual condition of the embodiments.

Figure 2:
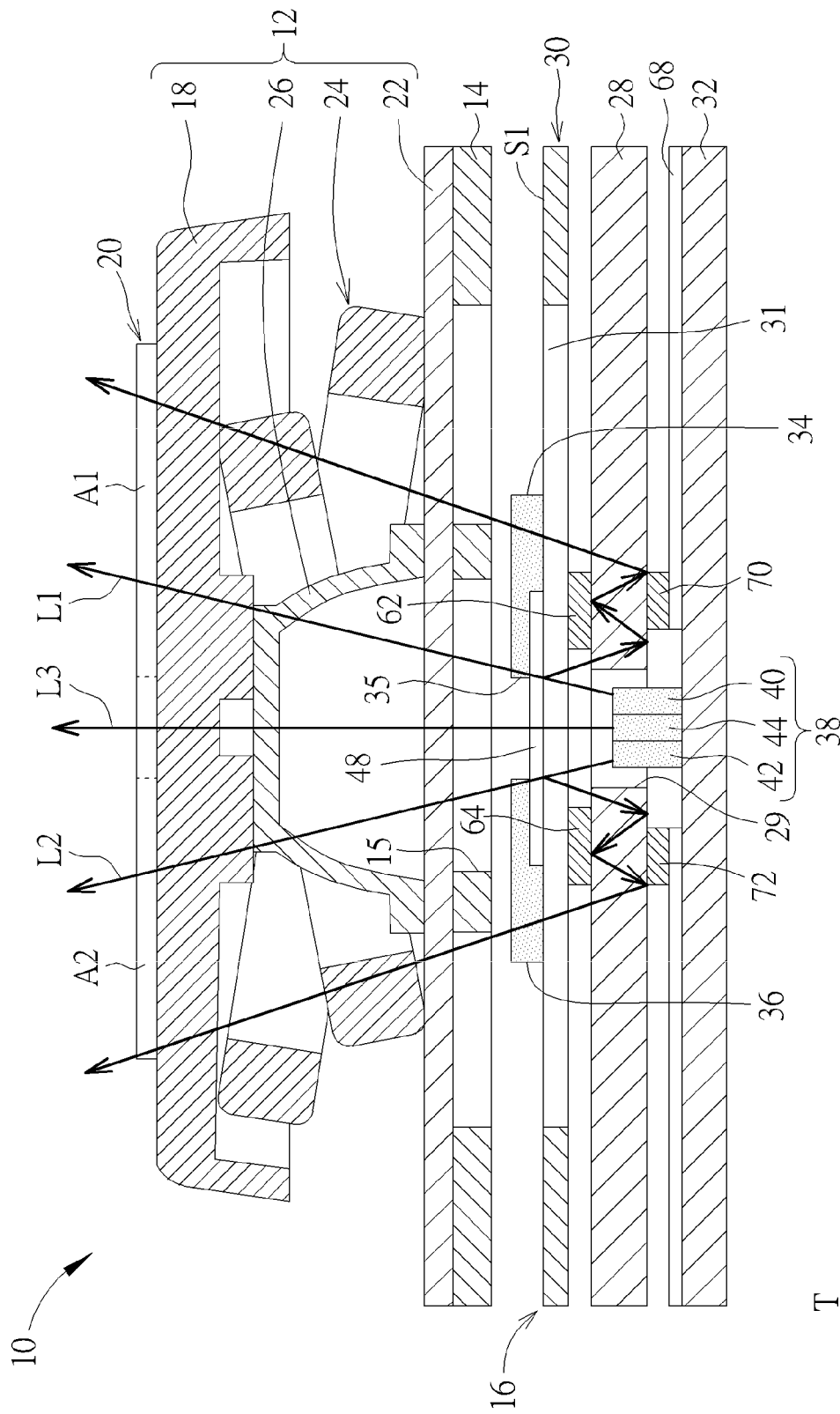
FIG. 2 is a cross-sectional diagram of the backlight keyswitch in FIG. 1 along a longitudinal direction of a cap.

Please refer to FIG. 1 and FIG. 2. FIG. 1 is a top perspective view of a backlight keyswitch 10 according to an embodiment of the present invention. FIG. 2 is a cross-sectional diagram of the backlight keyswitch 10 in FIG. 1 along a longitudinal direction L of a cap 18. For clearly showing the ink layer configuration of the backlight keyswitch 10, only the cap 18, a board 14, and a backlight module 16 are illustrated in FIG. 1.

The backlight keyswitch 10 could be preferably applied to a foldable electronic apparatus composed of an upper cover and a lower casing or an electronic device with a keyswitch input function (e.g., notebook or keyboard device, but not limited thereto) and provides a symbol lighting function for a user to execute a desired input function. As shown in FIG. 1 and FIG. 2, the backlight keyswitch 10 includes a keyswitch body 12, the board 14, and the backlight module 16.

The keyswitch body 12 has the cap 18, and at least one symbol 20 (only one is shown in the middle position of the cap 18 in FIG. 1 as an example, but the number, forming positions, and sizes of symbols are not limited thereto) formed on the cap 18. The board 14 is disposed under the keyswitch body 12 and connected to the keyswitch body 12, so as to make the cap 18 movable up and down relative to the board 14. The board 14 has at least one through hole area 15 (three are shown in the middle position of the board 14 in FIG. 1 as an example, but the number, forming positions, and sizes of through holes are not limited thereto). As for the related description for other components of the keyswitch body 12, it is commonly seen in the prior art. For example, the keyswitch body 12 could further include a thin film circuit board 22, a lifting mechanism 24, and an elastic component 26 (but not limited thereto). The thin film circuit board 22 has a switch. The lifting mechanism 24 is movably disposed on the board 14 for supporting the cap 18 to approach or move away from the switch. The elastic force provided by the elastic component 26 can return the cap 18 to its original position for the subsequent pressing operations.

The detailed description for the ink layer design of the backlight module 16 is provided as follows. As shown in FIG. 1 and FIG. 2, the backlight module 16 is disposed under the board 14 and includes a light guide plate 28, a light-blocking sheet 30, a backlight circuit board 32, a first ink layer 34, and a second ink layer 36. The light guide plate 28 has an accommodating hole 29 corresponding to the keyswitch body 12. The light-blocking sheet 30 is disposed between the board 14 and the light guide plate 28 and has a transparent region 31 corresponding to the keyswitch body 12. The backlight circuit board 32 is disposed under the light guide plate 28 and has a backlight source 38. The backlight source 38 is disposed in the accommodating hole 29 and includes a first lighting unit 40, a second lighting unit 42, and a third lighting unit 44. As shown in FIG. 1 and FIG. 2, the first lighting unit 40, the third lighting unit 44, and the second lighting unit 42 are sequentially arranged along the longitudinal direction L and emit a first color light L1, a third color light L3, and a second color light L2 respectively to pass sequentially through the transparent region 31 and the through hole area 15 and then be incident to the symbol 20 after light mixing, so as to generate the symbol lighting effect. The first lighting unit 40 is preferably a blue light emitting diode emitting the first color light L1 (i.e., blue light), the second lighting unit 42 is preferably a red light emitting diode emitting the second color light L2 (i.e., red light), and the third lighting unit 44 is preferably a green light emitting diode emitting the third color light L3 (i.e., green light). The present invention is not limited thereto, which means colors of the first color light L1, the second color light L2, and the third color light L3 could be selected from any combination of red light, blue light and green light. The types and configurations of these colors could vary depending on the practical lighting application of the backlight keyswitch 10. For example, in another embodiment, the first lighting unit 40 could be a green light emitting diode, and the third lighting unit 44 could correspondingly be a blue light emitting diode. The three lighting units 40/42/44 are preferably five-sided (e.g., top and four sides) light emitting diodes. The light outputs from the tops of the lighting units 40/42/44 are the most, followed by the long sides of the lighting units 40/42/44 and least from the short sides of the lighting units 40/42/44. The side light output between any adjacent lighting units 40/42/44 could be partially blocked, preventing a full 360° light output in a vertical projection range of the lighting units 40/42/44.

The first ink layer 34 is formed on the light-blocking sheet 30. The first ink layer 34 is formed corresponding to a first color shift area A1 of the symbol 20 (the color shift range shown in FIG. 2, but not limited thereto) in FIG. 2 as an example, but the forming position of the first ink layer 34 is not limited thereto, meaning that as long as the first ink layer 34 is formed on the light-blocking sheet 30, whether light is directly incident to the keyswitch body 12 or travels from the light guide plate 28 to the keyswitch body 12, the first ink layer 34 can improve the overall light-mixing uniformity of the cap 18. The first color shift area A1 is located near the first lighting unit 40 along the longitudinal direction L, and the color of the first ink layer 34 corresponds to the color of the second color light L2 (i.e., red). The second ink layer 36 is formed on the light-blocking sheet 30. The second ink layer 36 is formed corresponding to a second color shift area A2 of the symbol 20 (the color shift range shown in FIG. 2, but not limited thereto) in FIG. 2 as an example, but the forming position of the second ink layer 36 is not limited thereto, meaning that as long as the second ink layer 36 is formed on the light-blocking sheet 30, whether light is directly incident to the keyswitch body 12 or travels from the light guide plate 28 to the keyswitch body 12, the second ink layer 36 can improve the overall light-mixing uniformity of the cap 18. The second color shift area A2 is located near the second lighting unit 42 along the longitudinal direction L, and the color of the second ink layer 36 corresponds to the color of the first color light L1 (i.e., blue). In this embodiment, the first ink layer 34 and the second ink layer 36 could be preferably in a fan shape along the longitudinal direction L (but not limited thereto, meaning that the present invention could adopt other pattern designs, such as square, circle, grid, etc.) and are symmetrically arranged. Fan angles of the first ink layer 34 and the second ink layers 36 could be preferably between 110° and 150° (but not limited thereto) and can together define a circular area 46 (a circular dotted area as shown in FIG. 1). The backlight source 38 is disposed at a center of the circular area 46, and a diameter of the circular area 46 could be preferably from two to ten times a length of the backlight source 38 along the longitudinal direction L (but not limited thereto). Further, the first ink layer 34 and the second ink layer 36 have a light emitting hole area 35 corresponding to the third lighting unit 44, and a diameter of the light emitting hole area 35 could be preferably greater than or equal to the length of the backlight source 38 along the longitudinal direction L (e.g., the diameter of the light emitting hole area 35 is 1.2 times the length of the backlight source 38 along the longitudinal direction L, but the present invention is not limited thereto). This allows the third color light L3 (green light) emitted upward by the third lighting unit 44 to directly pass through the transparent region 31, the light emitting hole area 35, and the through hole area 15 and be incident to the keyswitch body 12, thereby enhancing the utilization efficiency of the third color light L3 and the lighting brightness of the symbol 20.

Figure 3:
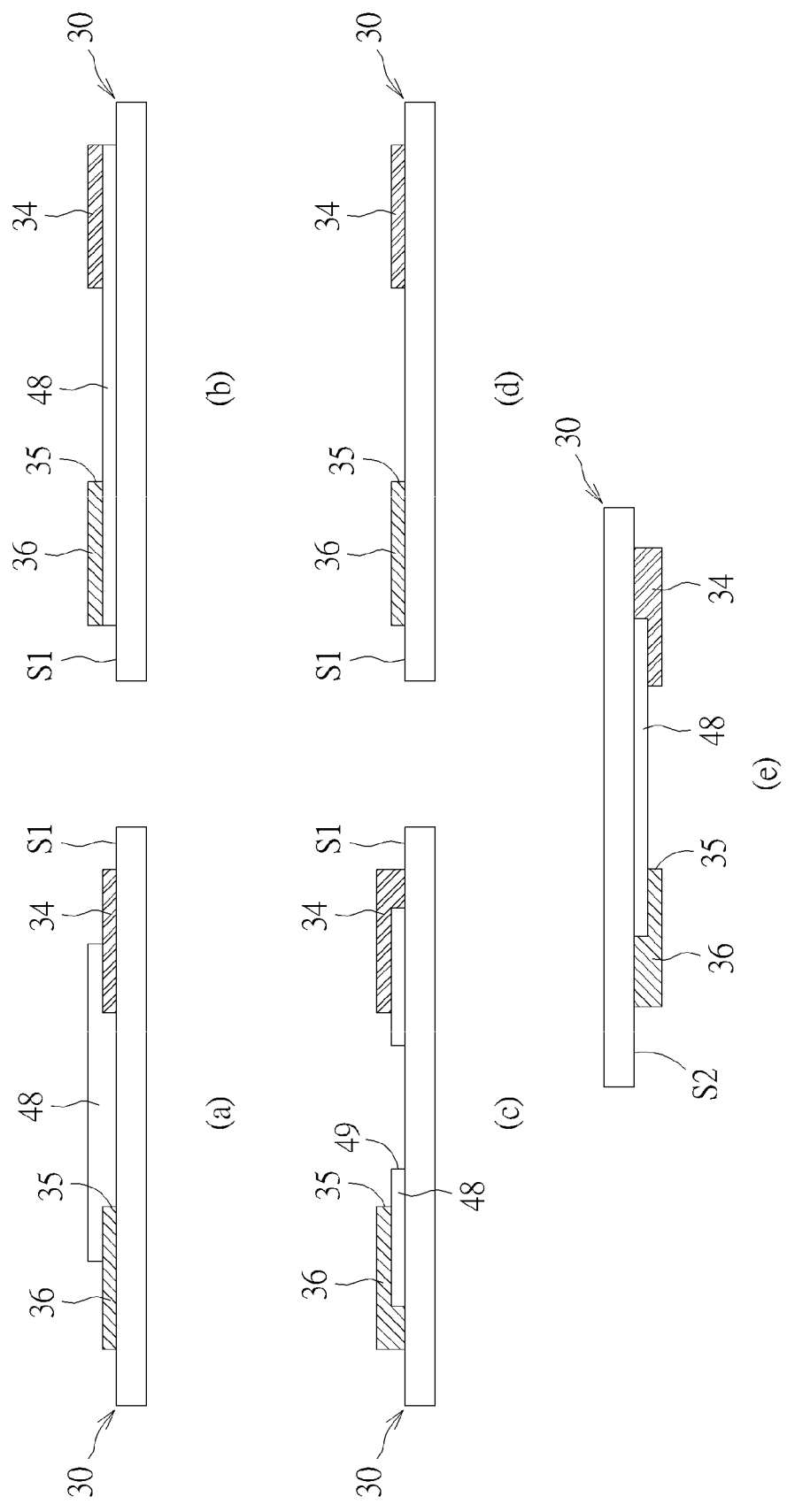
FIG. 3 is a diagram showing different ink layer configurations according to different embodiments of the present invention.

Furthermore, in practical application, to further enhance the utilization efficiency of light of the backlight source 38 being incident to the light guide plate 28, the backlight module 16 could further include a reflective ink layer disposed directly above the backlight source 38. The reflective ink layer could be a third ink layer 50 in FIG. 4, and could at least partially overlap with at least one of the first ink layer 34 and the second ink layer 36. Alternatively, the reflective ink layer could be disposed between the first ink layer 34 and the second ink layer 36, or even adjacent to the first ink layer 34 and the second ink layer 36 without overlapping. The reflective ink layer could be achieved by a white ink layer 48 in FIG. 3, paint with high reflective particles, or even a metal layer or metallic paint. The reflective ink layer should have a reflectivity of at least 15-20% and could also have a corresponding transmittance or absorption rate. The white ink layer 48 is formed on the light-blocking sheet 30 corresponding to the first ink layer 34 and the second ink layer 36 to at least partially reflect light emitted upward by the backlight source 38, so as to reflect the light back and forth to be incident to the light guide plate 28. The white ink layer 48 could be formed in a circular shape between the light-blocking sheet 30 and the first and second ink layers 34 and 36, and could partially overlap with the first and second ink layers 34 and 36 (as shown in FIG. 1). The white ink layer 48 and the first and second ink layers 34 and 36 could be preferably formed on an upper surface S1 of the light-blocking sheet 30, but the present invention is not limited thereto, meaning that the present invention could adopt other ink layer stacking designs, and the stacking orders, overlapping ratios, and light emitting hole configurations could be varied according to the practical lighting application of the backlight module 16. For example, as shown in FIG. 3(a), the first ink layer 34 and the second ink layer 36 could be formed between the light-blocking sheet 30 and the white ink layer 48 and partially overlap with the white ink layer 48; as shown in FIG. 3(b), the white ink layer 48 could be formed between the light-blocking sheet 30 and the first and second ink layers 34 and 36 and completely overlap with the first and second ink layers 34 and 36; as shown in FIG. 3(c), the white ink layer 48 could be formed between the light-blocking sheet 30 and the first and second ink layers 34 and 36 and partially overlap with the first and second ink layers 34 and 36, the first and second ink layers 34 and 36 could have the light emitting hole area 35 formed corresponding to the third lighting unit 44, and the white ink layer 48 could have a light emitting hole area 49 smaller than the light emitting hole area 35 (but not limited thereto, meaning that the present invention could adopt the design that the light emitting hole area 35 and the light emitting hole area 49 have the same diameter); as shown in FIG. 3(d), in the embodiment that the white ink layer 48 is omitted, the first ink layer 34 and the second ink layer 36 could be directly formed on the light-blocking sheet 30; as shown in FIG. 3(e), the white ink layer 48 could be formed between the light-blocking sheet 30 and the first and second ink layers 34 and 36, and the white ink layer 48 and the first and second ink layers 34 and 36 could be formed on a lower surface S2 of the light-blocking sheet 30. As for other derived embodiments (e.g., the embodiment that the first ink layer 34 and the second ink layer 36 are formed between the light-blocking sheet 30 and the white ink layer 48, and the white ink layer 48 has the light emitting hole area 49 smaller than the light emitting hole area 36), the related description could be reasoned by analogy according to FIG. 2 and FIG. 3 and omitted herein.

In summary, the backlight keyswitch provided by the present invention can utilize the first ink layer to partially filter the first color light and utilize the second ink layer to partially filter the second color light. This design can eliminate the color shift problem that the first color shift area of the symbol close to the first lighting unit may show a lighting color shifting to the first color light while the second color shift area of the symbol close to the second lighting unit may show a lighting color shifting to the second color light. In such a manner, the present invention can efficiently solve the prior art problem that lighting color shift occurs in the area of the symbol closer to the LED chip, so as to greatly enhance the lighting uniformity and the visual effect of the backlight keyswitch in use.

To be noted, the ink layer design is not limited to the aforesaid embodiments. The present invention could also adopt a complementary color design. For example, please refer to FIG. 4, which is a configuration diagram of the backlight source 38 with the first ink layer 34, the second ink layer 36 and the third ink layer 50 according to another embodiment of the present invention. In this embodiment, the backlight module 16 could further include two third ink layers 50, and the fan angle of the first ink layer 34 and the second ink layer 36 could be greater than 180°, so as to make the first ink layer 34 and the second ink layer 36 overlap partially to form two complementary ink layers 52 (magenta formed from red and blue), producing a complementary mixed light effect for the third lighting unit 44. On the other hand, the two third ink layers 50 preferably correspond to the third color light L3 (i.e., green), and could be fan-shaped in the longitudinal direction L and formed on the light-blocking sheet 30 respectively corresponding to the first ink layer 34 and the second ink layer 36. Accordingly, the first ink layer 34 could partially overlap with the third ink layer 50 to form a complementary ink layer 54 (yellow formed from red and green) for the first lighting unit 40, and the second ink layer 36 could overlap with the third ink layer 50 to form a complementary ink layer 56 (cyan formed from blue and green) for the second lighting unit 42. On the other hand, the present invention could also adopt a single-layer complementary ink layer design. In another embodiment, the first ink layer 34 can directly adopt a single-layer ink design that the ink color is a complementary color (i.e., yellow) to the first color light L1, and the second ink layer 36 can directly adopt a single-layer ink design that the ink color is a complementary color (i.e., cyan) to the second color light L2.

Figure 4:
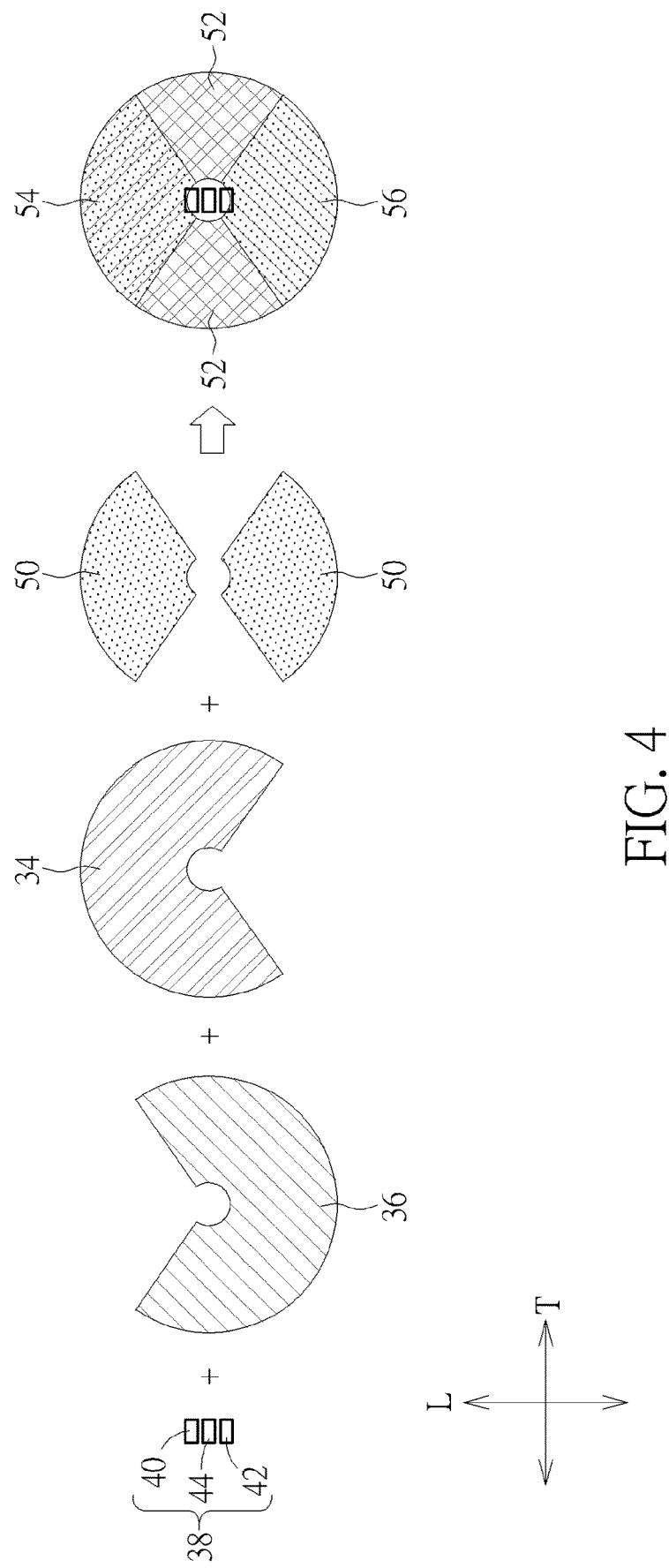
FIG. 4 is a configuration diagram of a backlight source with a first ink layer, a second ink layer and a third ink layer according to another embodiment of the present invention.

Furthermore, since the top surface of the backlight source 38 emits light, the first ink layer 34, the second ink layer 36, and the third ink layer 50 could selectively overlap at least partially with the lighting units 40/42/44 of that backlight source 38, to reflect and mix the different lighting colors of the lighting units 40/42/44 as early as possible. Referring to FIGS. 1, 3 and 4, the first ink layer 34 is at least disposed on the light-blocking sheet 30 corresponding to an outer side of the first lighting unit 40, such as an upper long side and left and right short sides of the first lighting unit 40 in FIGS. 1 and 4. Similarly, the second ink layer 36 is at least disposed on the light-blocking sheet 30 corresponding to an outer side of the second lighting unit 42, such as a lower long side (not blocked by an adjacent long side of the third lighting unit 44) and left and right short sides of the second lighting unit 42 in FIGS. 1 and 4.

Figure 5:
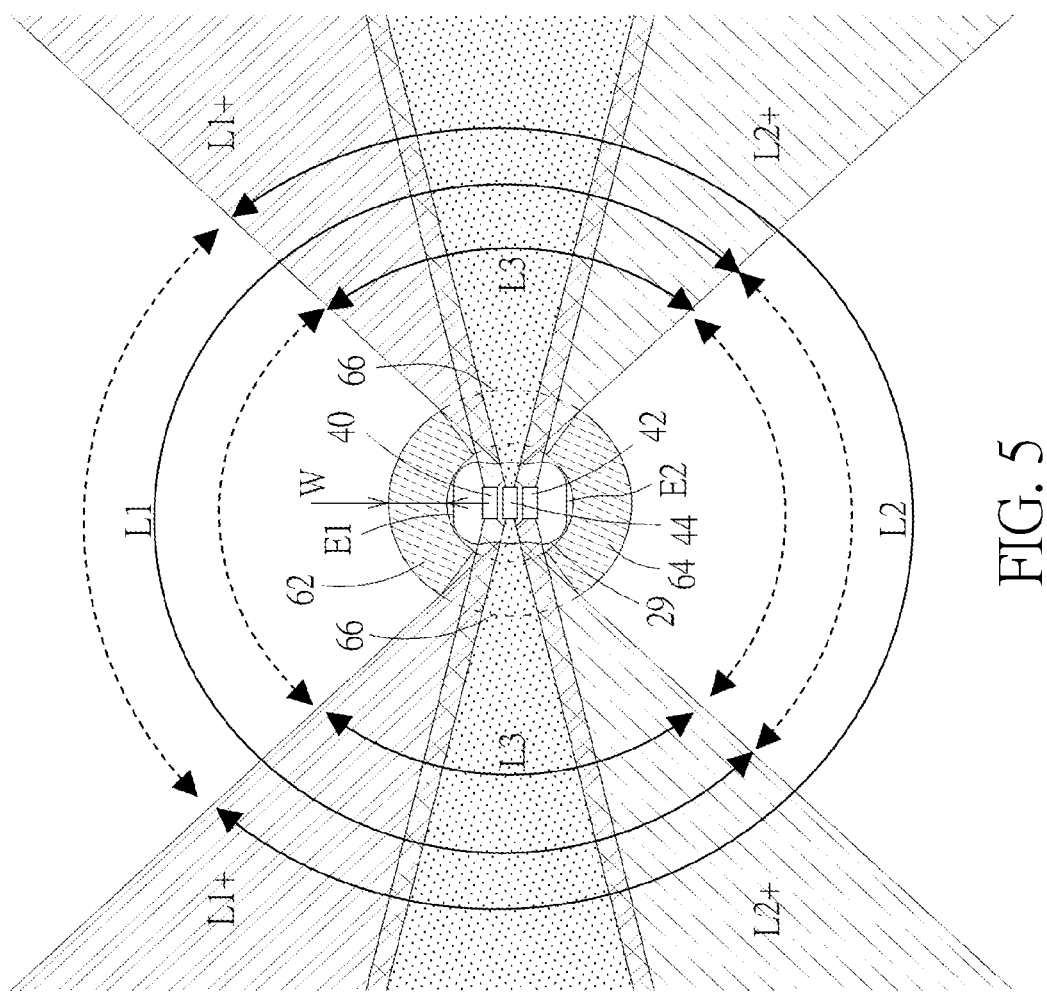
FIG. 5 is an enlarged top view of the backlight source, a first adhesive layer, a second adhesive layer, and an accommodating hole in FIG. 2.

In principle, since the third lighting unit 44 is positioned between the first lighting unit 40 and the second lighting unit 42, the color shift problem of the third lighting unit 44 is smaller. Therefore, the third ink layer 50 could be formed outside the two opposing edges of the light-blocking sheet 30 corresponding to the third lighting unit 44 (as shown in FIGS. 4 and 5) and be adjacent to and/or overlapped with the first ink layer 34 and the second ink layer 36. In FIG. 1, the third ink layer 50 could be a reflective ink layer that does not complement or filter the three color lights, such as a round white ink layer 48. The white ink layer 48 overlaps with the first ink layer 34 outside the long side of the first lighting unit 40, and also overlaps with the second ink layer 36 outside the long side of the second lighting unit 42. At the same time, the white ink layer 48 is independently disposed outside the two opposite short sides of the third lighting unit 44. Since the white ink layer 48 is semi-transmissive and semi-reflective, the outside of the two opposing short sides of the third lighting unit 44 is a good light-mixing area having more third color light L3. Disposing the white ink layer 48 here can slightly reduce the upward emission of the third color light L3. Similarly, the white ink layers 48 located outside the long sides of the first lighting unit 40 and the second lighting unit 42 could respectively reflect the first color light L1 and the second color light L2, thereby reducing the excessive upward emission of the first color light L1 and the second color light L2 through these two areas.

Figure 5A:
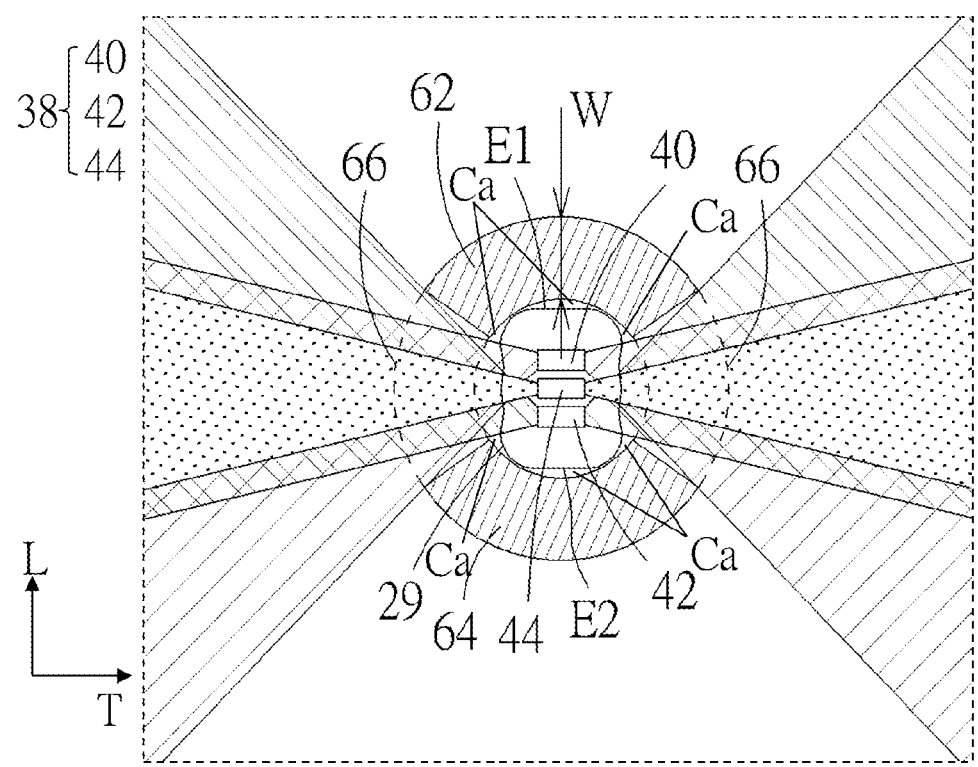
FIG. 5A is a partially enlarged top view of FIG. 5.

It should be mentioned that that the present invention could adopt an adhesive gap design using the good light coupling characteristic of the transparent adhesive material for enhancing the light mixing effect, so as to further eliminate the color shift problem on the cap 18 of the backlight keyswitch 10. For example, please refer to FIGS. 1, 2, and 5. FIG. 5 is an enlarged top view of the backlight source 38, a first adhesive layer 62, a second adhesive layer 64, and the accommodating hole 29 in FIG. 2. For the convenience of description, only the light emitting ranges of the color lights L1/L2/L3 of the three lighting units 40/42/44 in a transverse direction T are shown in FIG. 5. As shown in FIGS. 1, 2, and 5, at least one symbol 58 (only one is shown on the side of the cap 18 in FIG. 1 as an example, but the number, forming positions, and sizes of symbols are not limited thereto) could be formed on the cap 18. The board 14 has a through hole area 60 corresponding to the symbol 58. The backlight module 16 could further include a first adhesive layer 62 and a second adhesive layer 64. The first adhesive layer 62 is attached between the light-blocking sheet 30 and the light guide plate 28 and extends along a first hole edge E1 of the accommodating hole 29 corresponding to the first lighting unit 40. The second adhesive layer 64 is attached between the light-blocking sheet 30 and the light guide plate 28 and extends along extends along a second hole edge E2 of the accommodating hole 29 corresponding to the second lighting unit 40. The first adhesive layer 62 and the second adhesive layer 64 could be preferably in a fan shape in the longitudinal direction L and could be symmetrically arranged, so as to together define at least one adhesive gap area 66 (the adhesive gap area 66 could be regarded as a first adhesive gap area and there are two adhesive gap areas 66 shown in FIG. 5, but the present invention is not limited thereto) in the transverse direction T of the cap 18. A fan angle of the first adhesive layer 62 could be preferably 120°, and a projection width W of the first adhesive layer 62 in the longitudinal direction L could be preferably between 0.4 mm and 1.2 mm (this angle and width design could also be applied to the second adhesive layer 64), but the present invention is not limited thereto, meaning that the angle/width of the adhesive layer could be varied according to the practical symbol lighting application of the backlight keyswitch 10. Furthermore, referring to FIG. 5A, there are non-adhesive areas Ca between the first adhesive layer 62 and the accommodating hole 29 of the light guide plate 28 and between the second adhesive layer 64 and the accommodating hole 29 of the light guide plate 28, so as to prevent the first adhesive layer 62 and the second adhesive layer 64 from accidentally entering the accommodating hole 29 of the light guide plate 28 to attach to the backlight source 38 during the manufacturing process, causing premature light emission or detachment of the lighting units 40/42/44. The non-adhesive area Ca could be disposed on an upper surface of the light guide plate 28 (or between the light guide plate 28 and the light-blocking sheet 30). The non-adhesive area Ca could also be disposed on a lower surface of the light guide plate 28 (or between the light guide plate 28 and the backlight circuit board 32).

Via the aforesaid design, the first color light L1, the second color light L2, and the third color light L3 can be guided and mixed by the light guide plate 28 and sequentially pass through the transparent region 31 of the light-blocking sheet 30 and the through hole area 60 of the board 14 to be incident to the symbol 58, so as to generate the symbol lighting effect. During the light mixing process within the light guide plate 28, scattering and loss of the first color light L1 occur at the first adhesive layer 62, which not only reduces the first color light L1 entering a first color shift area A1' of the symbol 58 near the first lighting unit 40 to improve the color shift problem, but also expands the lighting angle (toward the lower left and lower right positions in FIGS. 1 and 5) of the first color light L1 through the adhesive gap area 66. This allows more first color light L1 to be incident to a second color shift area A2' (located at the lower left position in FIGS. 1 and 5) of the symbol 58 near the second lighting unit 42, so as to generate a color compensation effect for further improving the color shift problem that the lighting color of the second color shift area A2' is shifted to the color of the second color light L2. Similarly, scattering and loss of the second color light L2 occur at the second adhesive layer 64, which not only reduces the second color light L2 entering the second color shift area A2' of the symbol 58 to improve the color shift problem, but also expands the lighting angle (toward the lower left and lower right positions in FIGS. 1 and 5) of the second color light L2 through the adhesive gap area 66. This allows more second color light L2 to be incident to the first color shift area A1' (located at the lower left position in FIGS. 1 and 5) of the symbol 58, so as to generate a color compensation effect for further improving the color shift problem that the lighting color of the first color shift area A1' is shifted to the color of the first color light L1.

If the first adhesive gap area 66 is filled by the first adhesive layer 62 and the second adhesive layer 64, the first color light L1 moving toward a second outer side region L2+ would be scattered/reduced by the first adhesive layer 62 and the second adhesive layer 64, thereby greatly reducing the first color light L1 entering the second outer side region L2+. Thus, a color shift phenomenon of the second color light L2 may occur in the second outer side region L2+. On the contrary, if the first adhesive gap area 66 is filled by the first adhesive layer 62 and the second adhesive layer 64, the second color light L2 moving toward a first outer side region L1+ would be scattered/reduced by the first adhesive layer 62 and the second adhesive layer 64, thereby greatly reducing the second color light L2 entering the first outer side region L1+. Thus, a color shift phenomenon of the first color light L1 may occur in the first outer side region L1+.

In brief, the first adhesive layer 62 is disposed in parallel to the light guide plate 28 and extends along the first hole edge E1 of the accommodating hole 29 of the light guide plate 28 corresponding to the first lighting unit 40. The second adhesive layer 64 is disposed in parallel to the light guide plate 28 and extends along the second hole edge E2 of the accommodating hole 29 of the light guide plate 28 corresponding to the second lighting unit 42. The first adhesive layer 62 and the second adhesive layer 64 together define at least one first adhesive gap area 66 in the transverse direction T. The second adhesive layer 64 scatters the second color light L2, thereby reducing the second color light L2 reaching the outer side of the second adhesive layer 64 in the longitudinal direction L, while the first adhesive gap area 66 allows more second color light L2 to be incident to the first outer side region L1+ near the first lighting unit 40. Similarly, the first adhesive layer 62 scatters the first color light L1, thereby reducing the first color light L1 reaching the outer side of the first adhesive layer 64 in the longitudinal direction L, while the first adhesive gap area 66 allows more first color light L1 to be incident to the second outer side region L2+ near the second lighting unit 42.

In summary, the backlight keyswitch provided by the present invention adopts the adhesive gap design in which the first adhesive layer and the second adhesive layer respectively scatter/absorb the first color light and the second color light and the first color light and the second color light can be scattered toward the second color shift area and the first color shift area respectively through the adhesive gap area. As such, the present invention can eliminate the color shift problem that the lighting color of the first color shift area of the symbol is shifted to the color of the first color light and the lighting color of the second color shift area of the symbol is shifted to the color of the second color light. Therefore, the present invention can enhance the lighting uniformity and the visual effect of the backlight keyswitch in use.

To be noted, the aforesaid adhesive layer design could also be applied to the backlight circuit board and the light guide plate. For example, as shown in FIG. 2, the backlight keyswitch 10 could further include a reflective layer 68, a third adhesive layer 70, and a fourth adhesive layer 72. The reflective layer 68 is formed on the backlight circuit board 32 to reflect light emitted downward from the light guide plate 28 back to the light guide plate 28. The third adhesive layer 70 is attached between the reflective layer 68 and the light guide plate 28 and extends along the first hole edge E1 of the accommodating hole 29 corresponding to the first lighting unit 40. The fourth adhesive layer 72 is attached between the reflective layer 68 and the light guide plate 28 and extends along the second hole edge E2 of the accommodating hole 29 corresponding to the second lighting unit 42, so as to define another adhesive gap area (which could be regarded as a second adhesive gap area) in the transverse direction T together with the third adhesive layer 70. The adhesive extension angles/widths of the third adhesive layer 70 and the fourth adhesive layer 72 and the adhesive gap area configuration could be reasoned by analogy according to FIG. 5 and omitted herein.

Via the aforesaid design, when the first color light L1 is incident to the third adhesive layer 70, it may cause light scattering/absorption, thereby reducing the first color light L1 entering the first color shift area A1' to improve the color shift problem. At the same time, this design can also scatter the first color light L1 to the second color shift area A2' through the aforementioned adhesive gap area for achieving color compensation. Similarly, when the second color light L2 is incident to the fourth adhesive layer 72, it may cause light scattering/absorption, thereby reducing the second color light L2 entering the second color shift area A2' to improve the color shift problem. At the same time, this design can also scatter the second color light L2 to the first color shift area A1' through the aforementioned adhesive gap area for achieving color compensation. To be noted, the present invention could also adopt a design that the adhesive layers are only disposed between the reflective layer 68 and the light guide plate 28. For example, in another embodiment, the backlight keyswitch 10 only attaches the first adhesive layer 62 and the second adhesive layer 64 between the reflective layer 68 and the light guide plate 28. The first adhesive layer 62 extends along the first hole edge E1 of the accommodating hole 29 corresponding to the first lighting unit 40, and the second adhesive layer 64 extends along the second hole edge E2 of the accommodating hole 29 corresponding to the second lighting unit 42, so as to define an adhesive gap area between the reflective layer 68 and the light guide plate 28 in the transverse direction T together with the first adhesive layer 62. As for other related descriptions for this embodiment, it could be reasoned by analogy according to FIG. 5 and omitted herein.

Furthermore, in different embodiments, the first adhesive layer 62 and the second adhesive layer 64 do not need to be coplanar. That is to say, the first adhesive layer 62 and the second adhesive layer 64 could be disposed on different surfaces of the light guide plate 28. As long as the first adhesive layer 62 and the second adhesive layer 64 are disposed in parallel to the light guide plate 28 and are located on opposite sides of the backlight source 38 for defining at least one first adhesive gap area 66 between the first adhesive layer 62 and the second adhesive layer 64 in the vertical projection direction, the present invention can still achieve a good light mixing effect along an extended light path of each first adhesive gap area 66. Similarly, the third adhesive layer 70 and the fourth adhesive layer 72 could be disposed on different surfaces of the light guide plate 28 to define at least one second adhesive gap area between the third adhesive layer 70 and the fourth adhesive layer 72 for providing a better light mixing effect.

Figure 6:
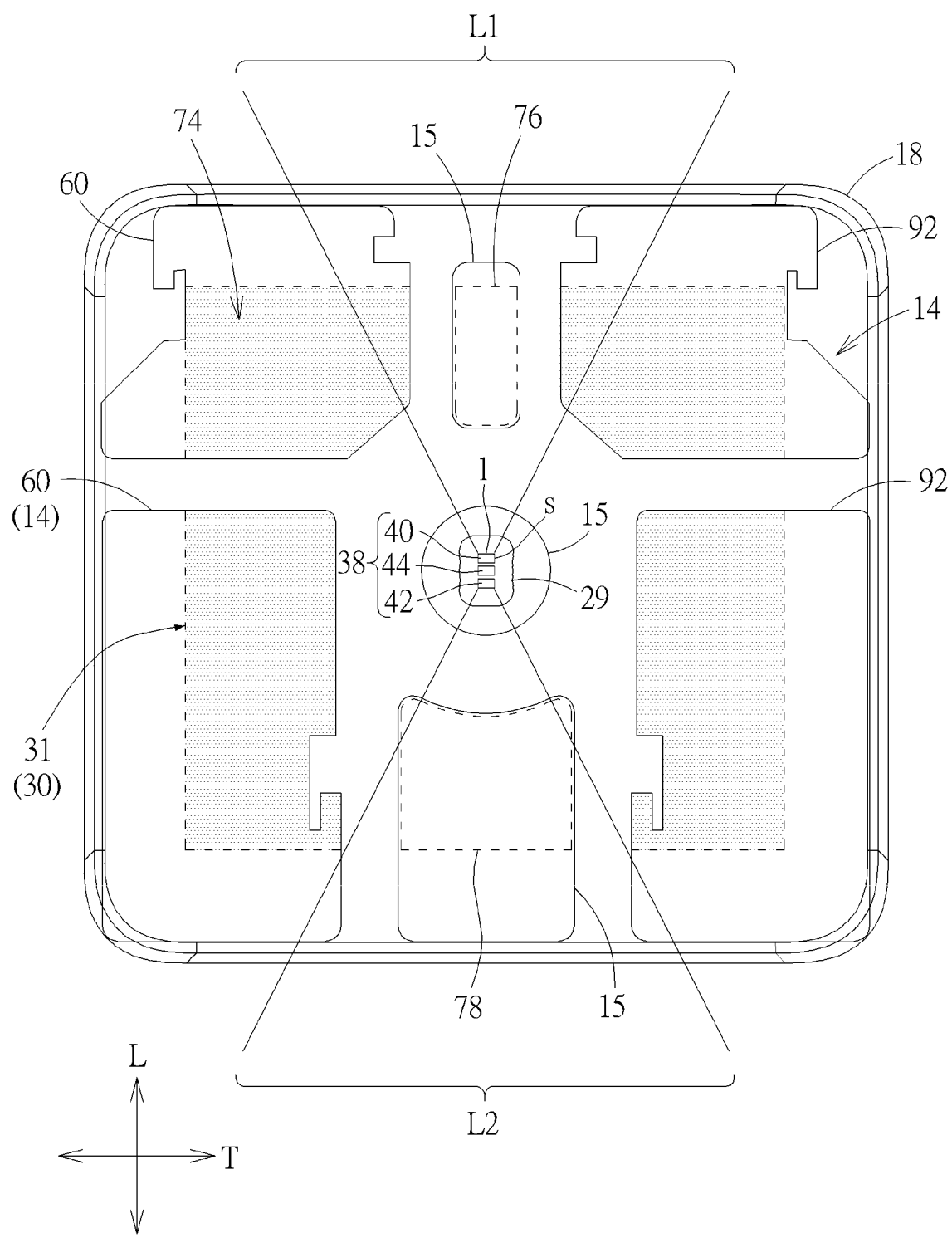
FIG. 6 is a top view of the cap, a board, the backlight source, and a light guide plate in FIG. 2.

In addition, for further improving the color shift problem on the symbol, the present invention could adopt a micro-optical layer clearance design. For example, please refer to FIG. 1, FIG. 2, and FIG. 6. FIG. 6 is a top view of the cap 18, the board 14, the backlight source 38, and the light guide plate 28 in FIG. 2. As shown in FIGS. 1, 2, and 6, the backlight module 16 further includes a micro-optical layer 74 formed corresponding to the through hole area 60 to guide the first color light L1, the second color light L2, and the third color light L3 to illuminate the symbol 58 through the light guide plate 28. A first clearance area 76 (as shown by the dashed line area in FIG. 6, but not limited thereto) is formed on the micro-optical layer 74 and is adjacent to the first lighting unit 40 in the longitudinal direction L. A second clearance area 78 (as shown by the dashed line area in FIG. 6, but not limited thereto) is formed on the micro-optical layer 74 and is adjacent to the second lighting unit 42 in the longitudinal direction L. The micro-optical layer 74 could be formed on the light guide plate 28 (e.g., on the upper or lower surface of the light guide plate 28, but not limited thereto, meaning that the present invention could adopt the design in which the micro-optical layer 74 is formed on an upper surface of the backlight circuit board 32 or the reflective layer 68) and could adopt a micro-dot structure design (but not limited thereto, meaning that the present invention could adopt other optical scattering designs, such as a metallic paint/white paint design, a concave-convex dot structure design, and a continuous linear microstructure design). The micro-optical layer 74 adopts a configuration in which optical scattering structures are removed within the first clearance area 76 and the second clearance area 78.

Furthermore, in this embodiment, as shown in FIG. 6, long sides I of the first lighting unit 40, the second lighting unit 42, and the third lighting unit 44 could be perpendicular to the longitudinal direction L, and the first clearance area 76 and the second clearance area 78 could correspond to the long sides I of the first lighting unit 40 and the second lighting unit 42, respectively. That is, the three lighting units 40/42/44 are arranged in sequence and their long sides l are adjacent to each other, or the three lighting units 40/42/44 are aligned collinearly by their short sides s, wherein the longitudinal direction L is parallel to the short sides of the first lighting unit 40, the second lighting unit 42 and the third lighting unit 44, but the present invention is not limited thereto. In another embodiment, the first lighting unit 40, the second lighting unit 42 and the third lighting unit 44 are arranged with their short sides s perpendicular to the longitudinal direction L, meaning that the three lighting units 40/42/44 are arranged collinearly by their long sides or are arranged in sequence by their short sides (see the dotted lines in FIG. 7), wherein the longitudinal direction L is parallel to the long sides of the first lighting unit 40, the second lighting unit 42 and the third lighting unit 44, respectively, and the first clearance area 76 and the second clearance area 78 correspond to the short sides s of the first lighting unit 40 and the second lighting unit 42, respectively. This can reduce the light emitting area of the first lighting unit 40, the second lighting unit 42 and the third lighting unit 44 in the longitudinal direction L, thereby reducing the color shift phenomenon of the symbol 20 in the longitudinal direction L. To be noted, the arrangement of the first lighting unit 40, the second lighting unit 42 and the third lighting unit 44 with their long or short sides perpendicular to the longitudinal direction L could be applied to other embodiments of the present invention, and the related description could be reasoned by analogy according to FIG. 6 and omitted herein.

As a result, via the aforesaid micro-optical layer clearance design, the present invention can reduce the first color light entering the first color shift area of the symbol and reduce the second color light entering the second color shift area of the symbol. This ensures that a first mixed color obtained from the first color light, the third color light, and the second color light mixed in the first clearance area is similar to a second mixed color obtained from the first color light, the third color light, and the second color light mixed in the second clearance area, so as to effectively eliminate the color shift problem that the first color shift area of the symbol close to the first lighting unit may show a lighting color shifting to the first color light while the second color shift area of the symbol close to the second lighting unit may show a lighting color shifting to the second color light. In such a manner, the present invention can efficiently solve the prior art problem that lighting color shift occurs in the area of the symbol closer to the LED chip, so as to greatly enhance the lighting uniformity and the visual effect of the backlight keyswitch in use.

Figure 7:
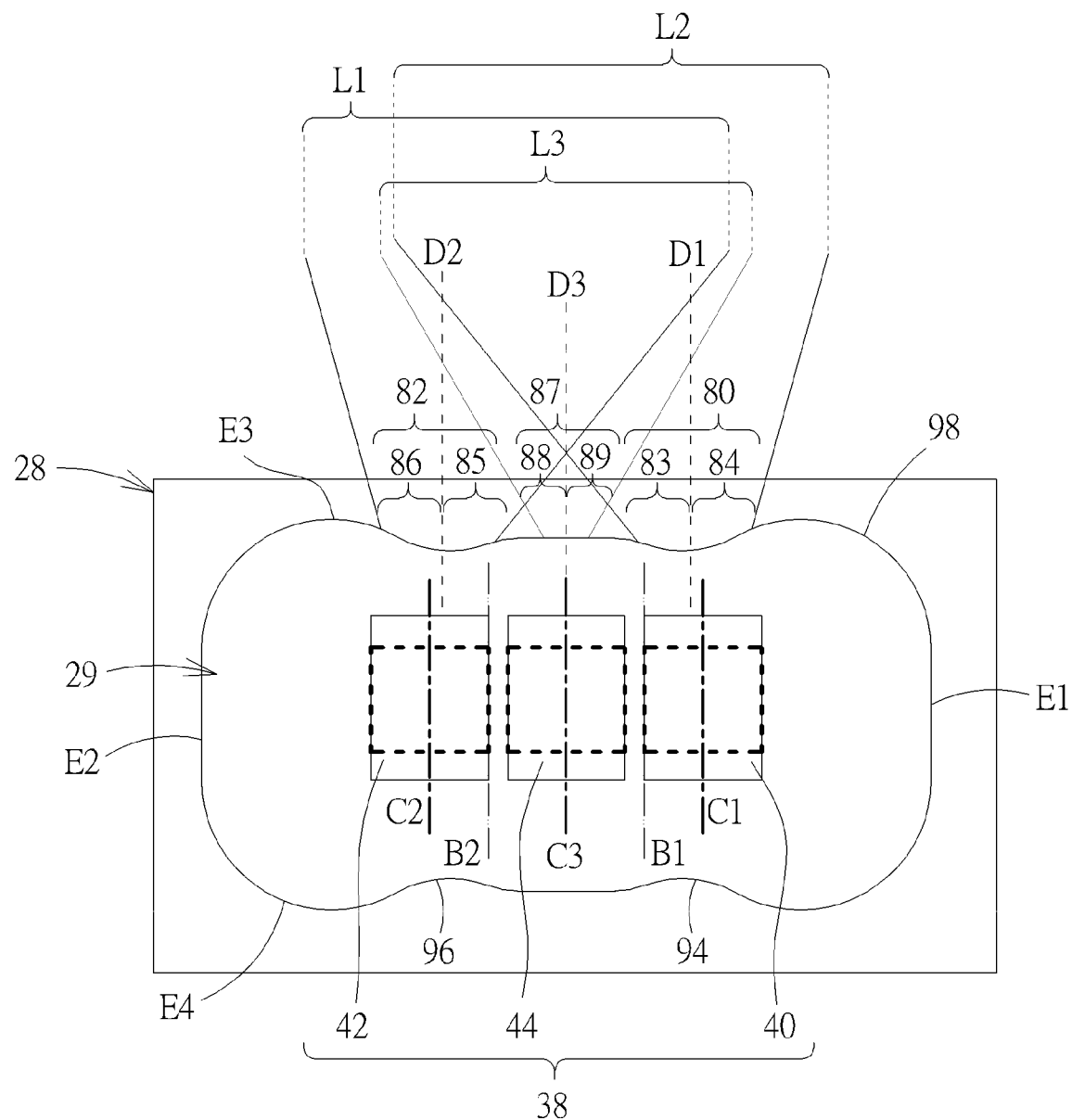
FIG. 7 is an enlarged top view of the backlight source disposed in the accommodating hole of the light guide plate in FIG. 1.
Figure 8:
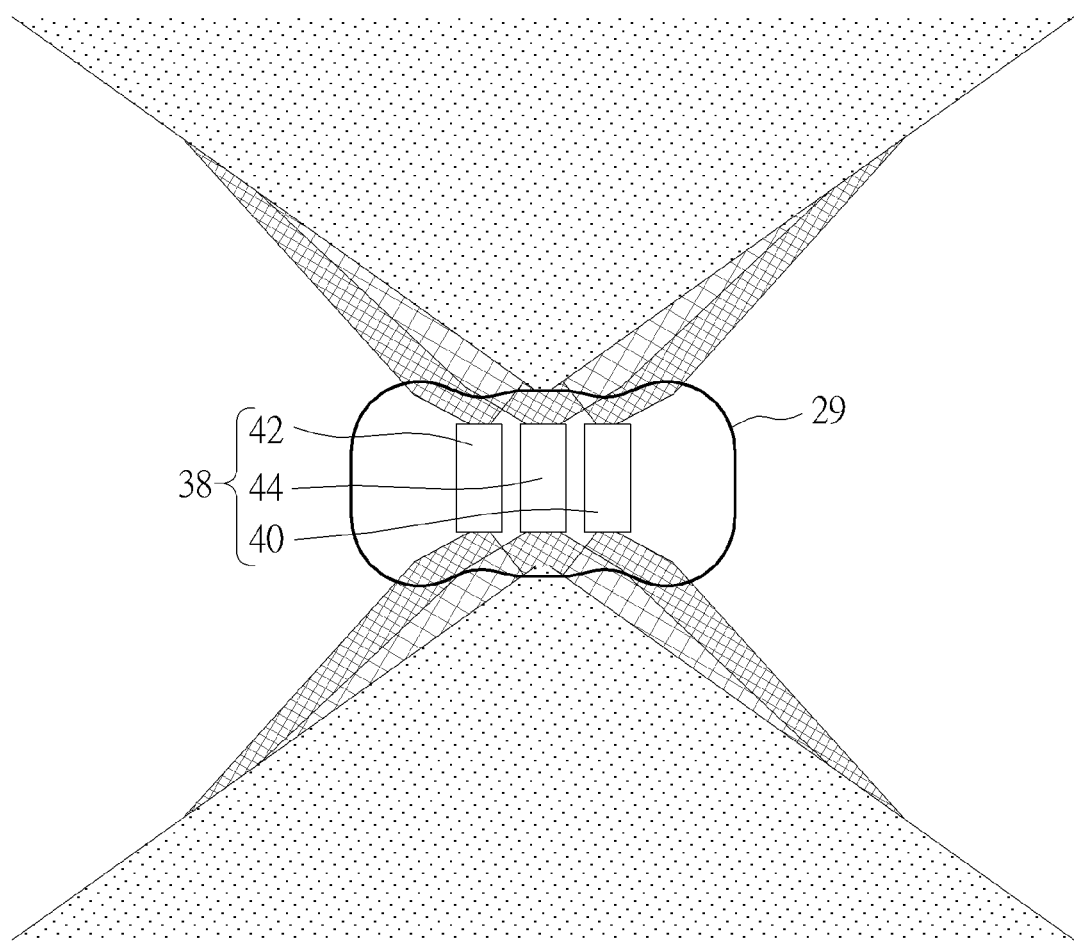
FIG. 8 is a light output diagram of the backlight source disposed in the accommodating hole in FIG. 7.

In practical application, the present invention could further adopt a design in which non-linear sections are formed on a hole wall of the accommodating hole of the light guide plate to evenly mix the first color light, the second color light, and the third color light, so as to enhance the effect of eliminating color shift in light mixing. For example, please refer to FIGS. 1, 7, and 8. FIG. 7 is an enlarged top view of the backlight source 38 disposed in the accommodating hole 29 of the light guide plate 28 in FIG. 1. FIG. 8 is a light output diagram of the backlight source 38 disposed in the accommodating hole 29 in FIG. 7. For clarity, in FIG. 8, the light emission from the three lighting units 40/42/44 in the longitudinal direction L is omitted. As shown in FIGS. 1, 7, and 8, the board 14 has the through hole area 60 (could be regarded as the first through hole area) corresponding to the symbol 58 (could be regarded as the first symbol). A first hole wall E3 of the accommodating hole 29 corresponding to the symbol 58 could at least include a first section 80 and a second section 82 formed in a non-linear manner. The first section 80 and the second section 82 respectively correspond to the first lighting unit 40 and the second lighting unit 42. A connection line between the first section 80 and the second section 82 is substantially perpendicular to the transverse direction T. The aforesaid non-linear manner could be interpreted as an edge curve of the first section 80 and the second section 82 from the top view.

The first section 80 is used to guide the first color light L1 from the first lighting unit 40 toward the second section 82. The first section 80 could further be divided into a first inner area 83 and a first outer area 84. The first outer area 84 could be inclined toward the second section 82, and the first inner area 83 could be inclined toward the first outer area 84. Furthermore, the first section 80 could form a convex surface facing the first lighting unit 40. In this embodiment, a boundary line D1 between the first inner area 83 and the first outer area 84 could point toward a position between a center axis C1 of the first lighting unit 40 and an edge B1 near the second lighting unit 42. The first inner area 83 and the first outer area 84 of the first section 80 could selectively be in a non-spherical, hyperbolic, or reflex curve shape, and the actual shape design depends on the design demand. The first inner area 83 mainly guides the first color light L1 toward the second section 82, while the first outer area 84 guides the first color light L1 to output toward the transverse direction T from the backlight source 38.

The second section 82 is used to guide the second color light L2 from the second lighting unit 42 toward the first section 80. The second section 82 could further be divided into a second inner area 85 and a second outer area 86. The second outer area 86 could be inclined toward the first section 80, and the second inner area 85 could be inclined toward the second outer area 86. Furthermore, the second section 82 could form a convex surface facing the second lighting unit 42. In this embodiment, a boundary line D2 between the second inner area 85 and the second outer area 86 could point toward a position between a center axis C2 of the second lighting unit 42 and an edge B2 near the first lighting unit 40. The second inner area 85 and the second outer area 86 of the second section 82 could selectively be in a non-spherical, hyperbolic, or reflex curve shape, which could be identical to or different from the first inner area 83 and the first outer area 84, and the actual shape design depends on the design demand. The second inner area 85 mainly guides the second color light L2 toward the first section 80, while the second outer area 86 guides the second color light L2 to output toward the transverse direction T from the backlight source 38.

In addition, as shown in FIGS. 7 and 8, the first hole wall E3 of the accommodating hole 29 could further have a light guiding section 87. The light guiding section 87 is located between the first section 80 and the second section 82 and corresponds to the third lighting unit 44. A distance between the light guiding section 87 and the third lighting unit 44 could be greater than a distance between the first section 80 and the first lighting unit 40 and greater than a distance between the second section 82 and the second lighting unit 42. The third color light L3 from the third lighting unit 44 is emitted toward the light guiding section 87 for mixing evenly with the first color light L1 and the second color light L2 over a very short distance to achieve a uniform light mixing effect.

The light guiding section 87 could be a flat surface, a curved surface, a slanted surface, or any combination thereof. If the light guiding section 87 is a flat surface, the third color light L3 is emitted according to the light emission angle of the third lighting unit 44 and may be refracted slightly when passing through the flat surface. If the light guiding section 87 is a curved surface, the light guiding section 87 could selectively be divided into two light guiding areas 88 and 89, which could be in a non-spherical or hyperbolic shape, depending on the design demands. The light guiding areas 88 and 89 could guide the third color light L3 from the third lighting unit 40 toward the first section 80 and the second section 82 respectively for mixing together with the first color light L1 and the second color light L2. In a preferable embodiment, a boundary line D3 between the two light guiding areas 88 and 89 could point toward a center axis C3 of the third lighting unit 44, meaning the boundary line D3 aligns with the center axis C3, or a misalignment error between the boundary line D3 and the center axis C3 is less than a predetermined threshold.

In such a manner, the design that the accommodating hole 29 has the first section 80, the second section 82, and the light guiding section 87 formed thereon can mix the first color light L1, the second color light L2, and the third color light L3 over a very short distance in the transverse direction T to achieve a uniform light mixing effect. This allows the first color light L1, the second color light L2, and the third color light L3 to mix evenly within the light guide plate 28 and pass through the through hole area 60 to be incident to the symbol 58, thereby enhancing the color shift elimination effect.

To be noted, the aforesaid light refracting design of the light guide plate could also be applied to another hole wall of the accommodating hole 29. To be brief, as shown in FIGS. 1, 7, and 8, at least one symbol 90 (one shown in FIG. 1, but not limited thereto, wherein the symbol 90 could be regarded as the second symbol) could be formed on the cap 18. The board 14 has at least one through hole area 92 (two shown in FIG. 1, but not limited thereto, wherein the through hole area 92 could be regarded as the second through hole area) corresponding to the symbol 90. A second hole wall E4 of the accommodating hole 29 corresponding to the symbol 90 is divided into a third section 94 and a fourth section 96 in a non-linear manner respectively corresponding to the first lighting unit 40 and the second lighting unit 42. The first hole wall E3 and the second hole wall E4 are respectively located on opposite sides of the backlight source 38. The third and fourth sections 94 and 96 and the first and second sections 80 and 82 are respectively located on the opposite sides of the backlight source 38. The third section 94 directs the first color light L1 from the first lighting unit 40 toward the fourth section 96, and the fourth section 96 directs the second color light L2 from the second lighting unit 42 toward the third section 94, so as to make the first color light L1, the second color light L2, and the third color light L3 mixed in the light guide plate 28 and pass through the through hole area 92 to be incident to the symbol 90. As for other related description for the second hole wall E4 of the accommodating hole 29, it could be reasoned by analogy according to the detailed description for the first hole wall E3 of the accommodating hole 29 and omitted herein.

As shown in FIG. 8, the output light with several colors (which means an illumination range drawn in grid) emitted by the backlight source 38 can complete a light mixing function within a light mixing extension distance about 2 mm at a side of the backlight source 38, so that the white light (which means an illumination range drawn in dots) can be emitted to illuminate the backlight keyswitch 10.

Furthermore, in FIG. 7, the long sides l of the three lighting units 40/42/44 could be perpendicular to the longitudinal direction L, meaning that the three lighting units 40/42/44 are arranged in sequence and their long sides l are adjacent to each other, or the three lighting units 40/42/44 are aligned collinearly by their short sides s. Alternatively, the three lighting units 40/42/44 could be arranged with their short sides s perpendicular to the longitudinal direction L, meaning that the three lighting units 40/42/44 are collinearly aligned by their long sides, or the three lighting units 40/42/44 are arranged in sequence and their short sides are adjacent to each other (as shown in the dashed lines in FIG. 7).

The backlight module of the present invention adopts the design that the first section, the second section, and the third section of the accommodating hole facing the lateral sides of the lighting units are in an arc curve shape (i.e., the aforesaid non-spherical, hyperbolic, or reflex curve shape). The actual shape design is not limited to the aforementioned embodiments. The junction between the arc curve and other linear side of the accommodating hole could be chamfered. For example, a chamfered section 98 is formed between the first section 80 and the first hole edge E1 (preferably a linear edge) of the accommodating hole 29 along the longitudinal direction L corresponding to the first lighting unit 40. The aforesaid arc curve could also be composed of multiple linear segments, meaning that the arc curves of the first section, the second section, and the third section could be replaced by multiple linear segments in another embodiment. As long as the first section, the second section, and the third section are at least partially not parallel to the longitudinal direction, they can still provide the aforementioned good light mixing function.

In summary, according to the illumination distribution curve and the usage requirements of the backlight source 38, the backlight keyswitch 10 of the present invention can adjust the curvature of the hole wall of the accommodating hole 29 to improve the light mixing effect of the backlight source 38 for more lighting uniformity and avoiding the color shift problem. The light mixing function of the backlight source 38 is not limited to the two-color light mixing embodiment or the three-color light mixing embodiment, and depends on the design demand. The light mixing extension distance in the prior art is about 7 mm to 15 mm. Compared with the prior art, the present invention can greatly shorten the light mixing extension distance to less than 2 mm, thereby reducing the waste of mechanical space and product weight.

It should be mentioned that the ink layer design, the adhesive gap design, the micro-optical layer clearance design, and the accommodating hole section design mentioned in the aforesaid embodiments could be implemented separately or interactively to enhance the design flexibility of the backlight keyswitch of the present invention in eliminating the lighting color shift of the symbol on the cap. For example, in the embodiment that the micro-optical layer clearance design and the accommodating hole section design, the backlight keyswitch of the present invention could only adopt the ink layer design and the adhesive gap design to improve the lighting color shift of the symbol on the cap. As for other derived embodiments (e.g., the embodiment that only the ink layer design is adopted or the embodiment that the adhesive gap design, the micro-optical layer clearance design, and the accommodating hole section design are adopted), the related description could be reasoned by analogy and omitted herein. To be noted, the through hole area mentioned in the aforesaid embodiments (e.g., the through hole areas 15, 60, 92) can be regarded as the transparent regions of the board 14. In other words, the light permeable design of the board adopted by the present invention is not limited to the design that the through hole areas are formed on the non-transparent board (e.g., metal board) for allowing light to pass therethrough. The present invention could also adopt the design that the through hole areas are formed on the transparent board (e.g., plastic board) for allowing light to pass therethrough. As for which design is adopted, it depends on the practical application of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight keyswitch, comprising:
 a keyswitch body having a cap with at least one symbol formed thereon; and
 a backlight module disposed under the cap, the backlight module comprising:
 a light-blocking sheet having a transparent region corresponding to the cap;
 a light guide plate disposed under the light-blocking sheet and having an accommodating hole;
 a backlight circuit board disposed under the light guide plate and having a backlight source, the backlight source being disposed in the accommodating hole and comprising a plurality of lighting units arranged sequentially along a longitudinal direction for emitting a plurality of color lights different from each other to be incident to the transparent region after light mixing, the plurality of lighting units comprising a first lighting unit and a second lighting unit disposed at two opposite ends in the longitudinal direction;
 a first ink layer formed on the light-blocking sheet and located outside the first lighting unit, a color of the first ink layer at least corresponding to a color of a second color light of the plurality of color lights emitted by the second lighting unit to achieve a mixed color with a first color light of the plurality of color lights emitted by the first lighting unit; and
 a second ink layer formed on the light-blocking sheet and located outside the second lighting unit for partially adjusting the second color light, a color of the second ink layer at least corresponding to a color of the first color light to achieve the mixed color with the second color light.

2. The backlight keyswitch of claim 1, wherein the plurality of color lights are selected from any combination of red, blue, and green lights.

3. The backlight keyswitch of claim 1, wherein the first ink layer and the second ink layer are arranged in opposing fan shapes in the longitudinal direction, and the backlight source is located between the first ink layer and the second ink layer.

4. The backlight keyswitch of claim 1, wherein the first ink layer and the second ink layer together define a circular area, and the backlight source is located at a center of the circular area.

5. The backlight keyswitch of claim 1, wherein the first ink layer is partially overlapped with the second ink layer.

6. The backlight keyswitch of claim 1, wherein the backlight module further comprises two third ink layers, and the two third ink layers are formed on the light-blocking sheet and correspond to two opposite sides of at least a portion of the plurality of lighting units arranged in middle in the longitudinal direction.

7. The backlight keyswitch of claim 1, wherein the color of the first ink layer is a complementary color of the first color light, and the color of the second ink layer is a complementary color of the second color light.

8. The backlight keyswitch of claim 1, wherein the plurality of lighting units each comprises short sides and long sides, and the short sides are arranged parallel to the longitudinal direction.

9. The backlight keyswitch of claim 1, wherein the plurality of lighting units each comprises short sides and long sides, and the long sides are arranged parallel to the longitudinal direction.

10. The backlight keyswitch of claim 1, wherein the first ink layer and the second ink layer define a light emitting hole area corresponding to at least a portion of the plurality of lighting units arranged in middle in the longitudinal direction.

11. The backlight keyswitch of claim 10, wherein a diameter of the light emitting hole area is greater than or equal to a length of the backlight source in the longitudinal direction.

12. The backlight keyswitch of claim 1, wherein the backlight module further comprises:
 a reflective ink layer formed on the light-blocking sheet and located above the backlight source, configured for at least partially reflecting light emitted upward by the backlight source.

13. The backlight keyswitch of claim 12, wherein the reflective ink layer at least partially overlaps with at least one of the first ink layer and the second ink layer.

14. The backlight keyswitch of claim 12, wherein the reflective ink layer is formed between the first ink layer and the second ink layer.

15. A backlight module, comprising:
 a light-blocking sheet having a transparent region;
 a light guide plate disposed under the light-blocking sheet and having an accommodating hole;
 a backlight circuit board disposed under the light guide plate and having a backlight source, the backlight source being disposed in the accommodating hole and comprising a plurality of lighting units arranged sequentially along a longitudinal direction for emitting a plurality of color lights different from each other to be incident to the transparent region after light mixing, the plurality of lighting units comprising a first lighting unit and a second lighting unit disposed at two opposite ends in the longitudinal direction;
 a first ink layer formed on the light-blocking sheet and located outside the first lighting unit, a color of the first ink layer at least corresponding to a color of a second color light of the plurality of color lights emitted by the second lighting unit to achieve a mixed color with a first color light of the plurality of color lights emitted by the first lighting unit; and
 a second ink layer formed on the light-blocking sheet and located outside the second lighting unit, a color of the second ink layer at least corresponding to a color of the first color light to achieve the mixed color with the second color light.

16. A backlight keyswitch, comprising:
 a keyswitch body having a cap with at least one symbol formed thereon; and
 a backlight module disposed under the cap, the backlight module comprising:
 a light-blocking sheet having a transparent region corresponding to the cap;

a light guide plate disposed under the light-blocking sheet and having an accommodating hole corresponding to the cap;

a backlight circuit board disposed under the light guide plate and having a backlight source, the backlight source being disposed in the accommodating hole and comprising a plurality of lighting units arranged sequentially along a longitudinal direction for emitting a plurality of color lights different from each other to be incident to the transparent region after light mixing, the plurality of lighting units comprising a first lighting unit and a second lighting unit disposed at two opposite ends in the longitudinal direction;

a first adhesive layer disposed in parallel to the light guide plate, the first adhesive layer extending along a first hole edge of the accommodating hole and corresponding to the first lighting unit; and a second adhesive layer disposed in parallel to the light guide plate, the second adhesive layer extending along a second hole edge of the accommodating hole and corresponding to the second lighting unit, and the second adhesive layer and the first adhesive layer together defining at least one first adhesive gap area in a transverse direction;

wherein the second adhesive layer scatters a second color light of the plurality of color lights emitted by the second lighting unit to reduce the second color light reaching an outer side of the second adhesive layer in the longitudinal direction, and the at least one first adhesive gap area makes more second color light incident to a first outer side region adjacent to the first lighting unit;

the first adhesive layer scatters a first color light of the plurality of color lights emitted by the first lighting unit to reduce the first color light reaching an outer side of the first adhesive layer in the longitudinal direction, and the at least one first adhesive gap area makes more first color light incident to a second outer side region adjacent to the second lighting unit.

17. The backlight keyswitch of claim 16, wherein the first adhesive layer and the second adhesive layer are in opposing fan shapes in the longitudinal direction, and the backlight source is located between the first adhesive layer and the second adhesive layer.

18. The backlight keyswitch of claim 16, wherein the backlight keyswitch comprises two first adhesive gap areas respectively corresponding to the backlight source.

19. The backlight keyswitch of claim 16, wherein the first adhesive layer and the second adhesive layer are respectively located between the light guide plate and the light-blocking sheet.

20. The backlight keyswitch of claim 16, wherein the first adhesive layer and the second adhesive layer are respectively located between the light guide plate and the backlight circuit board.

21. The backlight keyswitch of claim 16, wherein a non-adhesive area is disposed between the first adhesive layer and the accommodating hole of the light guide plate.

22. The backlight keyswitch of claim 16, wherein the plurality of lighting units each comprises short sides and long sides, and the short sides are arranged parallel to the longitudinal direction.

23. The backlight keyswitch of claim 16, wherein the plurality of lighting units each comprises short sides and long sides, and the long sides are arranged parallel to the longitudinal direction.

24. A backlight module, comprising:

a light-blocking sheet having a transparent region;

a light guide plate having an accommodating hole;

a backlight circuit board disposed under the light guide plate and having a backlight source, the backlight source being disposed in the accommodating hole and comprising a plurality of lighting units arranged sequentially along a longitudinal direction for emitting a plurality of color lights different from each other to be incident to the transparent region after light mixing, the plurality of lighting units comprising a first lighting unit and a second lighting unit disposed at two opposite ends in the longitudinal direction;

a first adhesive layer disposed in parallel to the light guide plate, the first adhesive layer extending along a first hole edge of the accommodating hole and corresponding to the first lighting unit; and a second adhesive layer disposed in parallel to the light guide plate, the second adhesive layer extending along a second hole edge of the accommodating hole and corresponding to the second lighting unit, and the second adhesive layer and the first adhesive layer together defining at least one first adhesive gap area in a transverse direction;

wherein the second adhesive layer scatters the second color light to reduce a second color light of the plurality of color lights emitted by the second lighting unit reaching an outer side of the second adhesive layer in the longitudinal direction, and the at least one first adhesive gap area makes more second color light incident to a first outer side region adjacent to the first lighting unit;

the first adhesive layer scatters a first color light of the plurality of color lights emitted by the first lighting unit to reduce the first color light reaching an outer side of the first adhesive layer in the longitudinal direction, and the at least one first adhesive gap area makes more first color light incident to a second outer side region adjacent to the second lighting unit.

* * * * *